United States Patent [19]

DenBesten

[11] Patent Number: 4,588,233
[45] Date of Patent: May 13, 1986

[54] PADDED RAIL PLATE FOR TRACKED VEHICLES

[76] Inventor: Leroy E. DenBesten, 1235 Rte. 9, Castleton-on-Hudson, N.Y. 12033-9648

[21] Appl. No.: 574,398

[22] Filed: Jan. 27, 1984

[51] Int. Cl.[4] ............................................. B62D 55/22
[52] U.S. Cl. .................................................. 305/51
[58] Field of Search ................ 305/51, 35 R, 35 EB, 305/38, 54

[56] References Cited

U.S. PATENT DOCUMENTS 1,296,512  3/1919  Hatfield .......................... 305/35 R
3,944,296  3/1976  Stampone ....................... 305/35 R Primary Examiner—Robert B. Reeves
Assistant Examiner—Carol L. Olson
Attorney, Agent, or Firm—Kane, Dalsimer, Kane, Sullivan and Kurucz

[57] ABSTRACT

A padded rail plate for use on a tracked vehicle is provided having a track rail plate adapted to be affixed to a track of a tracked vehicle, a resilient pad affixed to a surface of the track rail plate in order to protect the track rail plate and a road surface to be contacted thereby from damage during operation of the tracked vehicle, an anchoring device which provides a bearing surface for the resilient pad and which anchors the resilient pad between the bearing surface and the track rail plate in order to prevent pad material from being ripped from the track rail plate.

4 Claims, 2 Drawing Figures

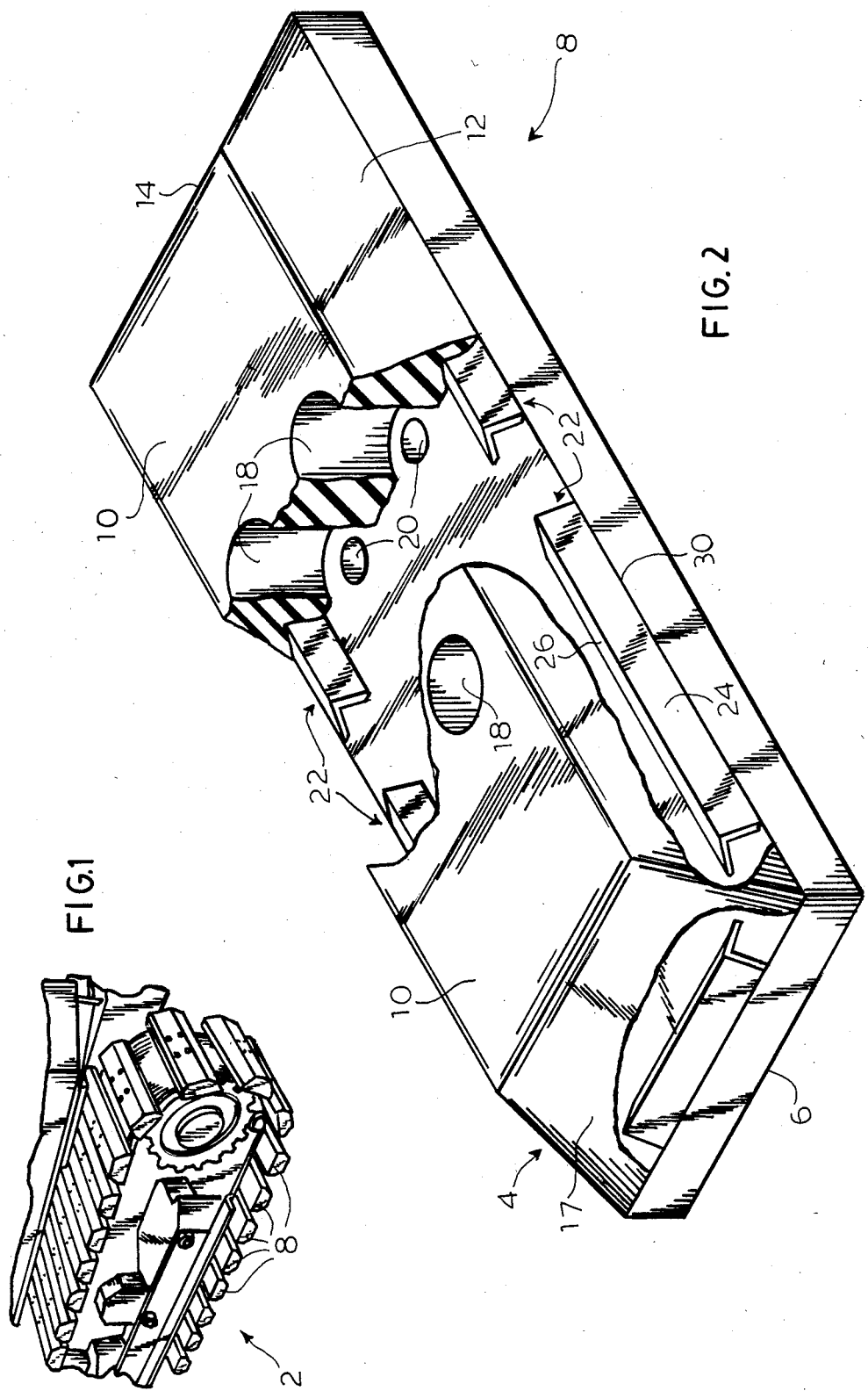

PADDED RAIL PLATE FOR TRACKED VEHICLES

BACKGROUND OF THE INVENTION

This invention pertains to padded track rails and more particularly to padded rail plate for use on a tracked vehicle adapted to prevent the pad from ripping away from the track rail during use.

Tracked vehicles include various pieces of heavy machinery including concrete cutters, diggers, ice cutters, paving machinery, cranes, bulldozers and the like. The use of tracks provides improved traction on concrete surfaces and improved stability and flotation on softer surfaces such as dirt. Generally the tractor rails are composed of forged steel. The great weight associated with these vehicles, often more than ten tons, results in great pressure exerted upon a road surface by the track, especially during turning of the vehicle. Track pads have been used to protect road surfaces from damage caused by tracks, as well as to protect the track rails themselves. Track pads also provide improved traction on hard surfaces.

Many resilient track rail pads have been developed and used to cover track rails. However, the high stresses applied to these pads during use has resulted in the recurrent problem of the pads separating and ripping away from the steel mounting rail prior to the pad wearing out. In addition to direct tearing forces applied to a track pad during use horizontal expansion and contraction of the pad which occurs as a result of the vertical deflection of the pad from pressure between the track and the roadway adds to the breaking and tearing of pads from the rail plate.

Attempts have been made to solve the problem of breaking and separating of track pads, see eg. U.S. Pat. No. 3,944,296. This patent discloses a track plate having curved ends about which a resilient pad means is molded. The edges of the resilient pad, however, are not anchored to the plate, nor is a bearing surface provided by the plate to protect the pad from direct tearing forces during use. Thus the problem of breaking of the edges of the pad and consequent tearing of the pad from the rail continues and is not adequately resolved by this design.

Additional attempts to solve the problem of pad breaking and separating have included pads which are easily removeable and replaceable upon the rail plate, see e.g. U.S. Pat. Nos. 2,686,697 (Baker) and 2,869,932 (Eichweber). Replaceable pads require frequent maintenance and constant observation. These pads do not provide a durable long-lasting track pad.

As can be seen from the above discussion, although many attempts have been made, the art has not succeeded in meeting the need for a durable track pad adapted to prevent breaking and ripping from the rail plate.

SUMMARY OF THE INVENTION

The primary object of the present invention is to overcome the aforementioned problems associated with prior track pads by providing an improved track pad having an anchor means which provides a bearing surface for the resilient pad means, and which anchors the resilient pad means between the bearing surface and the track rail plate. The anchor means includes a plurality of angle bars which are affixed along the edge of the track rail. The angle bars are effective in anchoring the edge of the resilient pad to the rail plate. The angle bars further provide a bearing surface to relieve certain direct forces on the pad at the juncture of the pad and the track rail, the location at which a ripped or torn pad is most likely to occur. In addition, pad deflection is decreased as a result of the support given at the side of the pad by the angle bars further reducing pad cracking and pad failure. The angled character of the angle bars facilitates their use in prevention of ripping of the pad from the track by distributing direct forces on the strips as well as direct forces on the side of the pad.

Another object of the present invention is to provide a track pad having inclined sides in order to provide greater stability to the pad and to help to prolong the life of the pad.

The padded rail plate of the present invention comprises a track plate adapted to be affixed to a track of a tracked vehicle, a resilient pad affixed to the surface of the track rail plate in order to protect the track rail plate and a road surface to be contacted thereby from damage during operation of the tracked vehicle, an anchoring device which provides a bearing surface for the resilient pad means and which anchors the resilient pad between the bearing surface and the track rail plate in order to prevent pad material from being ripped from the track rail plate.

BRIEF DESCRIPTION OF THE DRAWINGS

FIG. 1 is a perspective view of a track comprising a plurality of track rails having padded rail plates affixed thereto in accordance with the present invention, FIG. 2 is a perspective cutaway view of a padded rail plate affixed to a track rail in accordance with the present invention.

DETAILED DESCRIPTION OF THE PREFERRED EMBODIMENT

FIG. 1 illustrates a plurality of padded rail plates mounted on a track 2. Tracked vehicles generally include a left and a right track, each track forming an endless chain.

FIG. 2 illustrates resilient padded rail plate 4 affixed to track rail 6 comprising padded rail 8 in accordance with present invention. Pad 4 is composed of a resinous material and includes top portion 10, sides 12, 14, 16 and 17, apertures 18, and a base portion which adjoins rail plate 6. Rail plate 6 is composed of a heavy forged steel and includes apertures 20. The angle bars 22 are preferably formed by folding a sturdy flat steel strip along a seam producing elongated angled metal strip 22 having sides 24 and 26. Angled bars 22 are affixed to rail plate 6 preferably by welding. Alternately angle bars 22 may be integral with rail plate 6. An edge of angled metal strip 22 is affixed along common edge 30 of rail plate 6. Resilient pad 4 also adjoins rail plate 6 along common edge 30. In a like manner, all of the angle bars are affixed to the rail plate along a perimeter of the rail plate at an edge common with the rail plate and the resilient pad.

Side 24 of angle bar 22 is proximate to side 12 of pad 4. At this location side 24 serves as a bearing surface for side 12 of the pad. Angle bar 22 which is embedded within pad 4, also anchors pad 4 to rail plate 6 at edge 30 which is common to pad 4 and rail plate 6. The sides 12, 14, 16 and 17 of the resilient pad are inwardly inclined resulting in a top 10 of the resilient pad having a smaller area on its face than the area of the face of the base portion which adjoins rail plate 6. The angle made by side 24 of angle bar 22 with the rail plate may be equal to or less than the angle made between the pad sides and rail plate 6. The side 24 of angle bar 22 may be flush with side 12 of pad 4. However, in a preferred embodiment as illustrated in Figure bars, side 24 is flush with side 12 at the common edge 30 but it is set back from the surface of side 12 at points distant from common edge 30.

Apertures 18 of the resilient pad, and apertures 20 of the rail plate enable padded rail 8 to be affixed to track bars. To affix rail plate 6 to a track, bolts (not shown) are inserted into apertures 18 in the resilient pad, the stud portions of the bolts are inserted through apertures 20 in rail plate 6 while the head portion of the bolt rests within apertures 18 contacting rail plate 6. The threaded stud portion of the bolt also passes through an aperture in the track frame. A nut is threadingly engaged to a portion of the threaded stud which protrudes from the track frame thereby securing the padded rails to the track. To replace a padded rail the bolt may be disengaged, the worn padded rail removed, and a new padded rail placed in bolted engagement with the track.

To produce padded track 8, firstly angle bars 22 are welded to rail plate 6. Resilient pad 4 is then formed in contact with the rail plate and the angle bars by an injection molding process. A preheated resinous material is injected into a mold which contains rail plate 6 and angled strips 22. Pad 4 is formed into the shape shown in FIG. 2, with resinous material being injected both beneath and above the angled strips 22 thereby embedding strips 22 within the resilient pad. After a predetermined cooling period padded rail 8 is removed from the mold and is ready to be affixed to track 2.

Although a preferred embodiment of the present invention has been disclosed in detail herein it is to be understood that the scope of the present invention is not to be limited thereby, but is to be determined by the claims which follow.

What is claimed is:

1. A padded rail plate for use on a tracked vehicle comprising:

a track rail plate adapted to be affixed to a track of a tracked vehicle;

a resilient pad means affixed to a surface of the track rail plate in order to protect the track rail plate and a road surface to be contacted thereby from damage during use;

an anchor means which provides a bearing surface for the resilient pad means and which anchors the resilient pad means between the bearing surface and the track rail plate in order to prevent pad material from being ripped from the track rail plate, the anchor means being a plurality of angle bars embedded in the resilient pad means and being affixed to the rail plate along each edge thereof, only said angle bars being embedded in the resilient pad means and being adapted to anchor edges of the resilient pad means to the edges of the rail plate and further to shield said edges of the resilient pad means from certain ripping and tearing forces applied thereto during use, the angle bars comprising an elongated strip of metal which is folded along a seam into a first side and a second side, the first side of each angle bar being affixed along an edge of the rail plate which is common with an edge of the resilient pad means, the first side extending upwardly and inwardly away from the track rail plate and the second side extending downwardly and inwardly towards the track rail plate;

means for enabling the padded rail plate to be affixed to a track including a plurality of apertures in the resilient pad aligned with a plurality of apertures in the rail plate, said apertures adapted to receive a stud portion of a bolt therethrough.

2. The invention in accordance with claim 1 wherein the angle bars are welded to the rail plate.

3. The invention in accordance with claim 2 wherein the resilient pad is composed of a resinous material.

4. The invention in accordance with claim 3 wherein the resilient pad means comprises a pad having sides which incline inwardly from a base portion which contacts the rail plate to a top portion which is adapted to contact a road surface.

* * * * *